United States Patent
Soderlund et al.

(10) Patent No.: US 9,450,768 B2
(45) Date of Patent: Sep. 20, 2016

(54) SUBSCRIBER-SPECIFIC TRACING IN COMMUNICATIONS

(71) Applicant: NOKIA SOLUTIONS AND NETWORKS OY, Espoo (FI)

(72) Inventors: Jani Olavi Soderlund, Vantaa (FI); Juha Pekka Hyttinen, Kerava (FI); Jyrki Olavi Nousiainen, Tuusula (FI); Tapio Antero Kiviharju, Riihimäki (FI); Niko Markus Savolainen, Kerava (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 99 days.

(21) Appl. No.: 14/471,149

(22) Filed: Aug. 28, 2014

(65) Prior Publication Data

US 2015/0071129 A1 Mar. 12, 2015

(30) Foreign Application Priority Data

Sep. 10, 2013 (WO) ................. PCT/EP2013/068652

(51) Int. Cl.
| | | |
|---|---|---|
| *H04L 12/28* | (2006.01) | |
| *H04L 12/14* | (2006.01) | |
| *H04W 8/18* | (2009.01) | |
| *H04L 29/08* | (2006.01) | |

(52) U.S. Cl.
CPC .......... *H04L 12/1407* (2013.01); *H04L 67/22* (2013.01); *H04L 67/2804* (2013.01); *H04W 8/18* (2013.01)

(58) Field of Classification Search
None
See application file for complete search history.

(56) References Cited

U.S. PATENT DOCUMENTS

| | | | | |
|---|---|---|---|---|
| 2008/0059525 | A1* | 3/2008 | Kinder | H04L 29/12132 |
| 2010/0150003 | A1 | 6/2010 | Andreasen et al. | |
| 2011/0238547 | A1* | 9/2011 | Belling | G06Q 30/04 705/34 |
| 2011/0249572 | A1 | 10/2011 | Singhal et al. | |
| 2013/0003736 | A1* | 1/2013 | Szyszko | H04L 47/2441 370/392 |
| 2013/0258865 | A1* | 10/2013 | Kovvali | H04W 24/10 370/241 |
| 2014/0073285 | A1* | 3/2014 | Lehane | H04W 4/26 455/406 |
| 2014/0334302 | A1* | 11/2014 | Loach | H04L 47/32 370/235 |
| 2014/0372591 | A1* | 12/2014 | Payette | H04L 67/141 709/223 |
| 2014/0376405 | A1* | 12/2014 | Erickson | H04W 52/0212 370/254 |

OTHER PUBLICATIONS

International Search Report and Written Opinion dated May 21, 2014 corresponding to International Patent Application No. PCT/EP2013/068652.

* cited by examiner

*Primary Examiner* — Duc C Ho

(74) *Attorney, Agent, or Firm* — Squire Patton Boggs (US) LLP

(57) ABSTRACT

A method for subscriber tracing comprises capturing user plane packets in a network apparatus implementing a 3GPP policy and charging enforcement functionality PCEF. Packet-specific metadata is added to a captured user plane packet. The packet-specific metadata may be used for facilitating subscriber-specific troubleshooting of core network elements.

18 Claims, 2 Drawing Sheets

SUBSCRIBER-SPECIFIC TRACING IN COMMUNICATIONS

FIELD OF THE INVENTION

The exemplary and non-limiting embodiments of this invention relate generally to wireless communications networks, and more particularly to subscriber tracing.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

A policy and charging enforcement functionality (PCEF) refers to a technology that enables defining and applying operational and business-related rules in communications networks.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, an apparatus, and a computer program product as defined in the independent claims. Further embodiments of the invention are disclosed in the dependent claims.

An aspect of the invention relates to a method for subscriber tracing in a communications system, comprising capturing, in a network apparatus, user plane packets, wherein the apparatus implements a 3GPP policy and charging enforcement functionality PCEF; adding packet-specific metadata to a captured user plane packet, wherein the packet-specific metadata is used for facilitating subscriber-specific troubleshooting of core network elements.

A further aspect of the invention relates to an apparatus comprising at least one processor; and at least one memory including a computer program code, wherein the at least one memory and the computer program code are configured to, with the at least one processor, cause the apparatus to perform any of the method steps.

A still further aspect of the invention relates to a computer program product comprising program instructions which, when run on a computing apparatus, causes the computing apparatus to perform any of the method steps.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
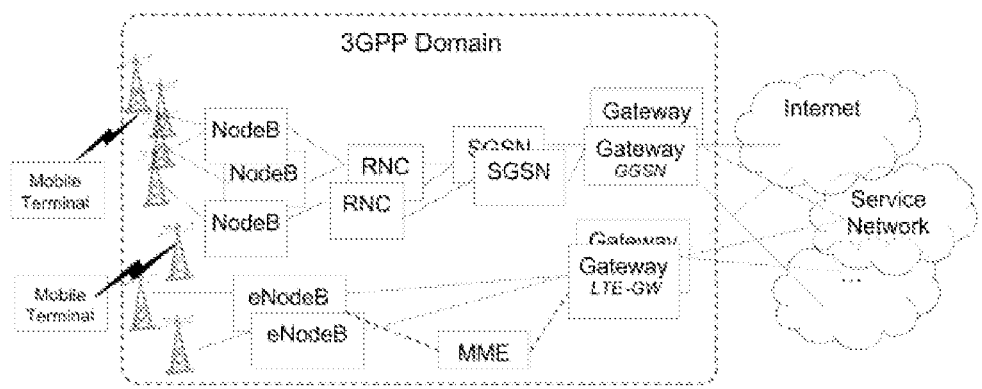
FIG. 1 illustrates a 3GPP network architecture.

In a mobile network, user sessions are established as tunnels between mobile terminals (MT) and gateways (GW). Due to cellular network architecture, gateways are aggregation points for the user sessions, providing an anchor towards services in the internet or operator service network. In 3G, the gateway may include a GGSN element, and in LTE, a SAE-GW element. FIG. 1 illustrates a 3GPP network.

Many network elements provide subscriber-specific tracing capabilities, usually implemented as direct traffic capture to a local storage (a memory or a hard drive) or port mirroring to some external system. Gateway products handle both control and user plane in the EPC system. While control plane messages are usually quite straightforward and may be easily understood, user plane packet captures do not tell currently anything about the treatment of the packet inside the system. Only packets in the ingress and egress may be captured.

Efficient troubleshooting becomes even more important in the advent of voice over LTE (VoLTE) era which is about to start.

In current live systems with a number of simultaneously connected subscribers reaching millions, it is not possible to do generic online interface capturing/tracing for troubleshooting purposes. Subscriber-specific tracing is needed, particularly as subscription-specific policies may also be done in granularity of an individual subscriber. Contemporary use cases offered by the mobile operators include different fair usage policies or differentiated charging which in many cases may be controlled and modified by the end user via operator's own service portal.

If a problem occurs, the troubleshooting has to be able to provide answers why the system behaves unexpectedly. PCRF, OCS or AAA servers are able to install and remove policies (implemented as PCC rule bases, PCC rules and PCC filters) dynamically during runtime. This leads to the situation that it is very complex to track what has been the actual configuration in a certain system at the time when the end user experienced problems.

The basic subscriber trace feature (available in gateways and some other products) is not able to describe what happens inside the system, for example, how a particular packet was charged. Many operators require precise byte-level accuracy to enable differentiated charging models.

Besides for the normal troubleshooting activities both by the operator and by the vendor, sometimes the product may have to write internal information meant for developers, like identifying the source code line causing some issue or alike, which may also be embedded to the trace for later offline analysis by experts.

Current gateways only support basic subscriber trace, but do not produce any metadata for the subscriber trace. For router products, metadata may be located only in the memory of the device, available locally for troubleshooting. This type of metadata is limited to very basic IP flow information like timestamps. In one method the metadata may be stored directly to the packet capture.

An exemplary embodiment enables a subscriber tracing functionality with standard metadata for troubleshooting EPC network elements. An exemplary embodiment proposes adding specific metadata to captured user plane packets in a 3GPP gateway element implementing a 3GPP policy and charging enforcement functionality (PCEF) to facilitate subscriber-specific troubleshooting. The metadata may include specific information whenever applicable for the packet. The metadata may include one or more of (but is not limited to):
 PCC rule name (the rule type being either dynamic or predefined), identifying the PCC rule,
 PCC rule base name, identifying the PCC rule base activated by a local default policy or external server; the same rule may also be included in multiple PCC rule bases, therefore the combination of the PCC rule base and the PCC rule may be required to fully identify the matching PCC rule,
 PCC rule action
 precedence
 PCC filter
 charging rating group
 charging service id
 policy monitoring key
 dropped packet (identification and reasoning)
  public part, documented in product-specific customer documentation; the reason may be categorized to several well-defined groups like: charging/packet inspection/shaper/resource limit,
  private part, intended only for troubleshooting by the product vendor; this may include an exact code point, licensing information, internal resource situation information, etc.

It may also be possible to add multiple metadata fields to the same packet, as it is usually the case that many of these fields are required for the same packet.

With this metadata, the operator is able to find out what was the treatment in the gateway for the specific packets and the packet flows. Specifically, it is possible to see if certain packet flows get different charging and policy control treatment. I.e. the operator is able to compare charging and policy control treatment experienced by different packet flows.

This information may be added directly to the packet itself, as allowed by the newly introduced metadata in the PCAP-NG (PCAP next generation) dump file format. In this way, the standard format allows any operator to utilize an existing, de-facto standard Wireshark tool family for analysing the captured packets.

The data may be encoded in multiple different ways, but the de-facto standard way is to use a TLV (type-length-value) structure.

The fields needed for the public parts are defined in the relevant 3GPP specifications, namely:
 1) 3GPP 29.212 policy and charging control; Gxx reference point
  rule activation
   rating group, service id, monitoring entry (key), filters for matching the traffic to a rule,
  Gx/Gxc monitoring
 2) 3GPP 32.299 charging management; diameter charging application
  dependency to online charging: the rating group visible in the captured packet may be the same that is visible in the OCS interface (Gy),
 3) 3GPP 32.251 charging management; packet switched (PS) domain charging
  dependency to offline charging: the rating group visible in the captured packet may be the same that is visible in the charging data records (CDRs) in Bp and GTP' interfaces.

The metadata is added to the packet at the specific capture points. These points may be located in the ingress and/or egress of packet processing. For performance reasons specifically for a gateway product with high throughput and latency requirements, the metadata may be added to the packet only once. This means that the data is collected in the memory buffers, and then, at the capture point, inserted to the packet. At the capture point, the original packet continues on its path to the original destination, while the capture packet (clone of the packet with the added metadata) is sent towards the product-specific data aggregation service where the data is also written to the permanent storage.

An exemplary embodiment enables improved troubleshooting capabilities. It also allows operators to try and verify their new business and charging models before actual deployments with real gateway systems. Especially when the charging and policy control is dependent on the DPI (deep packet inspection) capabilities, the rapidly changing protocol signatures and new services introduced in the internet may even obsolete the operator-defined PCC rules and filters in a very short period of time. Having a capability to verify the effectiveness of the configurations in a real network with an easy method greatly enhances the operator's possibilities for keeping up with the changes which are in many cases totally out of their control.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support subscriber tracing. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (or LTE-A) (long term evolution (advanced long term evolution)) network elements, without restricting the embodiment to such an architecture, however. The embodiments described in these examples are not limited to the LTE radio systems but can also be implemented in other radio systems, such as 3G, 4G, 5G, B4G, UMTS (universal mobile telecommunications system), GSM, EDGE, WCDMA, bluetooth network, WLAN, WiMAX or other fixed, mobile or wireless network. In an embodiment, the presented solution may be applied between elements belonging to different but compatible systems such as LTE and UMTS.

Figure 2:
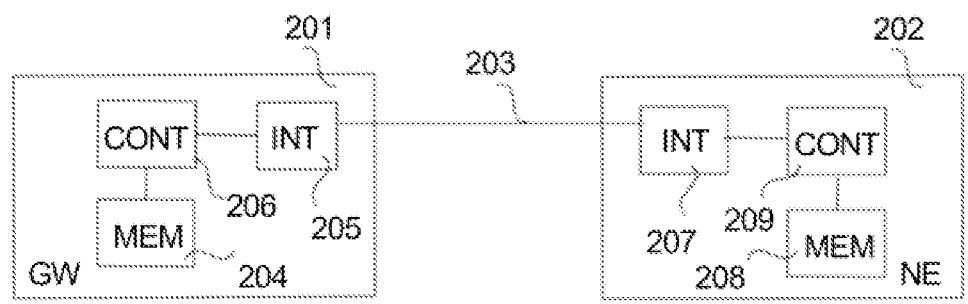
FIG. 2 shows a simplified block diagram illustrating exemplary apparatuses.

A general architecture of a communication system is illustrated in FIG. 2. FIG. 2 is a simplified system architecture only showing some elements and functional entities, all being logical units whose implementation may differ from what is shown. The connections shown in FIG. 2 are logical connections; the actual physical connections may be different. It is apparent to a person skilled in the art that the systems also comprise other functions and structures. It should be appreciated that the functions, structures, elements and the protocols used in or for subscriber tracing, are irrelevant to the actual invention. Therefore, they need not to be discussed in more detail here.

The exemplary radio system of FIG. 2 comprises a network node 201 of a network operator. The network node 201 may include gateway apparatus, e.g. a gateway GPRS support node (GGSN), a SAE gateway (SAE-GW), or any other network element, or a combination of network elements. The network node 201 may be connected to one or more core network (CN) elements 202 such as an EPC network element. In the example situation of FIG. 2, the EPC network element NE 202 is capable of connecting to the network node 201 via a connection 203, respectively.

The gateway apparatus or GW 201 comprises a controller 206 operationally connected to a memory 204 and an interface 205. The controller 206 controls the gateway apparatus or GW 201. The memory 204 is configured to store software and data. The network node 201 may also comprise various other components. They are not displayed in the figure due to simplicity. The network node 201 may be operationally connected (directly or indirectly) to another network element 202 of the communication system, such as an EPC network element 202, an O&M unit, or any other network element, or a combination of network elements, via the interface 205. The network node or NE 202 comprises a controller 209 operationally connected to a memory 208 and an interface 207. The controller 209 controls the operation of the network node 202. The memory 208 is configured to store software and data. The network node 202 may also comprise various other components. They are not displayed in the figure due to simplicity. The network node 202 may be operationally connected (directly or indirectly) to another network element 201 of the communication system, such as a gateway GPRS support node 201, a SAE gateway 201, an O&M unit, or any other network element, or a combination of network elements, via the interface 207. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 201, 202 has been depicted as one entity, different modules and memory may be implemented in one or more physical or logical entities. The apparatus may be a gateway GPRS support node (GGSN), a SAE gateway (SAE-GW), an EPC network element, a PDN gateway (PGW), an operation and maintenance centre (O&M unit, O&M), a switch, a radio network controller (RNC), a mobility management entity (MME), an MSC server (MSS), a mobile switching centre (MSC), a radio resource management (RRM) node, an operations, administrations and maintenance (OAM) node, a home location register (HLR), a visitor location register (VLR), a serving GPRS support node, a base station, an access point, a gateway, and/or a server. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, a tablet, and a line telephone.

The apparatus 201, 202 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 204, 208 may include volatile and/or non-volatile memory and typically stores content, data, or the like. For example, the memory 204, 208 may store computer program code such as software applications (for example for the detector unit and/or for the adjuster unit) or operating systems, information, data, content, or the like for a processor to perform steps associated with operation of the apparatus 201, 202 in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 3:
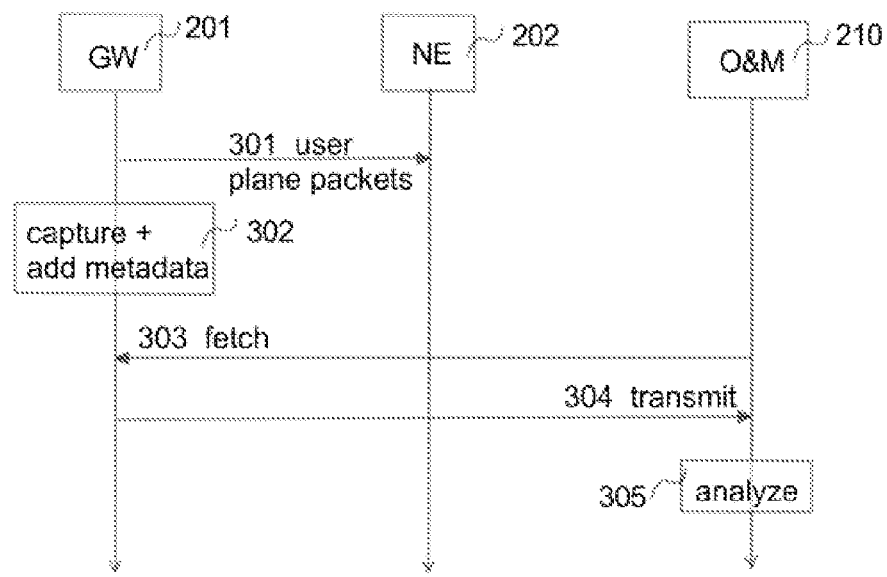
FIG. 3 shows a messaging diagram illustrating an exemplary messaging event according to an embodiment of the invention.

The signalling chart of FIG. 3 illustrates the required signalling. FIG. 3 illustrates exemplary subscriber tracing. In the example of FIG. 3, a core network node 201, e.g. gateway apparatus GW (such as a gateway GPRS support node or a SAE gateway, implementing a 3GPP policy and charging enforcement functionality (PCEF)), may be configured to capture 302 user plane packets transmitted 301 by a network node 202, e.g. a core network element NE (such as an evolved packet core EPC network apparatus). The gateway apparatus GW is configured to add 302 packet-specific metadata to a captured user plane packet. The packet-specific metadata may be used in the system (e.g. in an O&M unit, or in any network unit capable of connecting and fetching the files and running the Wireshark tool, such as a laptop of an operating personnel) for facilitating subscriber-specific troubleshooting of core network elements. The metadata may be collected 302, in the gateway apparatus GW 201, in memory buffers. The collected metadata may be inserted 302 to a packet at the capture point, and the gateway apparatus GW may be configured to store 302 the capture locally. The collected metadata may be sent 304 as part of a packet capture file to a product-specific data aggregation service for network operator analysis. For example, an operation and maintenance unit O&M 210 may be configured to fetch 303 the capture files from the apparatus 201, wherein the apparatus 201 may transmit 304 the collected metadata as part of a packet capture file to the O&M unit 210. Thus the captures may be aggregated 302 to files to a local hard disk from where they may be fetched 303 by the operator when needed.

Figure 4:
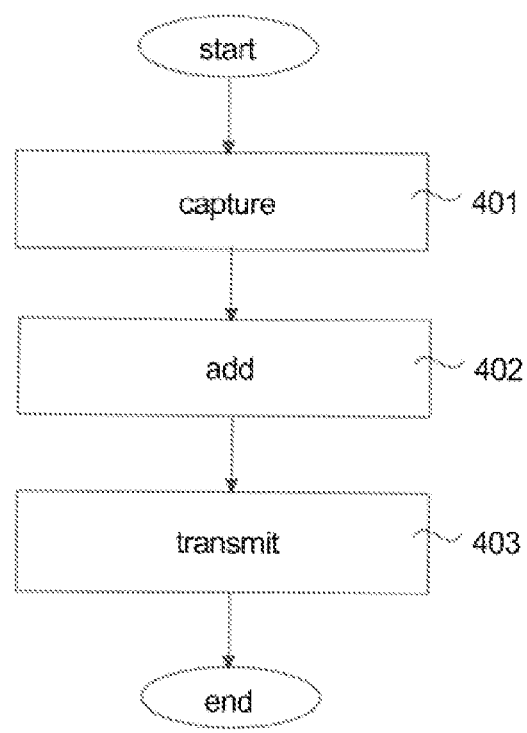
FIG. 4 shows a schematic diagram of a flow chart according to an exemplary embodiment of the invention.

FIG. 4 is a flow chart illustrating an exemplary embodiment. An apparatus 201, e.g. gateway apparatus GW (such as a gateway GPRS support node or a SAE gateway), may be configured to capture 401 user plane packets transmitted by a network node 202, e.g. a core network element NE (such as an evolved packet core EPC network apparatus). The gateway apparatus GW 201 is configured to add 402 packet-specific metadata to a captured user plane packet. The packet-specific metadata may be used (e.g. in an O&M unit) for facilitating subscriber-specific troubleshooting of core network elements. The metadata may be collected 402, in the gateway apparatus GW 201, in memory buffers. The gateway apparatus GW may be configured to store 402 the capture locally. The collected metadata may be inserted 402 to a packet at the capture point and, when needed, sent 403 as part of a packet capture file to a product-specific data aggregation service for network operator analysis.

Thus, according to an exemplary embodiment, there is provided a method for subscriber tracing in a communications system, comprising capturing, in a network apparatus, user plane packets, wherein the apparatus implements a 3GPP policy and charging enforcement functionality PCEF; adding packet-specific metadata to a captured user plane packet, wherein the packet-specific metadata is used for facilitating subscriber-specific troubleshooting of core network elements.

According to another exemplary embodiment, the metadata includes service awareness metadata and/or packet drop metadata.

According to yet another exemplary embodiment, the metadata includes one or more of a PCC rule name identifying a PCC rule, a PCC rule base name identifying a PCC rule base activated by a local default policy or an external server, a PCC rule action, precedence, a PCC filter, a charging rating group, a charging service id, a policy monitoring key, and an identification and a reasoning of a dropped packet.

According to yet another exemplary embodiment, the PCC rule name has a PCC rule type that is either dynamic or predefined.

According to yet another exemplary embodiment, the metadata includes: a public part documented in product-specific customer documentation; and/or a private part intended for troubleshooting by the product vendor, and including information on an exact code point, licensing information, internal resource situation information, and/or other private information.

According to yet another exemplary embodiment, the fields needed for the public parts include at least one of a rule activation field, a Gx/Gxc monitoring field, a dependency to online charging, wherein a rating group visible in the captured packet is the same that is visible on an OCS interface, and a dependency to offline charging, wherein the rating group visible in the captured packet is the same that is visible in charging data records CDR on Bp and GTP' interfaces.

According to yet another exemplary embodiment, the rule activation field includes at least one of a rating group, a service identification, a monitoring key, and a filter for matching traffic to the rule.

According to yet another exemplary embodiment, the method comprises adding one or multiple metadata fields to the same packet.

According to yet another exemplary embodiment, the metadata indicates to a network operator what was the treatment like in the network apparatus for a specific packet and packet flow.

According to yet another exemplary embodiment, the metadata enables a network operator to compare the charging and policy control treatment received by different packet flows in the network apparatus for a specific packet and packet flow.

According to yet another exemplary embodiment, the method comprises adding the metadata in a PCAP next generation PCAP-NG dump file format directly to the packet itself.

According to yet another exemplary embodiment, the method comprises encoding the metadata by using a suitable encoding method, such as a type-length-value TLV structure.

According to yet another exemplary embodiment, the metadata is added to the packet at the specific capture points located in the ingress and/or egress of packet processing.

According to yet another exemplary embodiment, the metadata is collected in memory buffers, and the collected metadata is inserted to a packet at the capture point for sending the metadata as part of a packet capture file to a product-specific data aggregation service.

According to yet another exemplary embodiment, the packet capture file is analysable by means of a de-facto standard Wireshark tool family.

According to yet another exemplary embodiment, there is provided an apparatus comprising at least one processor; and at least one memory including a computer program code, wherein the at least one memory and the computer program code are configured to, with the at least one processor, cause the apparatus to perform any of the method steps.

According to yet another exemplary embodiment, there is provided a computer program product comprising program instructions which, when run on a computing apparatus, causes the computing apparatus to perform any of the method steps.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

AAA authentication, authorization, and accounting
CP control plane

DPI deep packet inspection
GGSN gateway GPRS support node
GW gateway
EPC evolved packet core
LTE long term evolution
MME mobility management entity
MT mobile terminal
OCS online charging system
PCEF policy and charging enforcement functionality
SAE system architecture evolution
SGSN serving GPRS support node
UP user plane
VoLTE voice over LTE

The invention claimed is:

1. A method for subscriber tracing in a communications system, said method comprising:
    capturing, in a network apparatus, user plane packets, wherein the apparatus implements a 3GPP policy and charging enforcement functionality PCEF; and
    adding packet-specific metadata to a captured user plane packet,
    wherein the packet-specific metadata is used for facilitating subscriber-specific troubleshooting of core network elements, and
    wherein the metadata includes
        a public part documented in product-specific customer documentation, and/or
        a private part intended for troubleshooting by the product vendor, and including information on an exact code point, licensing information, internal resource situation information, and/or other private information.

2. A method according to claim 1, wherein the metadata includes service awareness metadata and/or packet drop metadata.

3. A method according to claim 1, wherein the metadata includes one or more of
    a PCC rule name identifying a PCC rule, a PCC rule base name identifying a PCC rule base activated by a local default policy or an external server, a PCC rule action, precedence, a PCC filter, a charging rating group, a charging service id, a policy monitoring key, and an identification and a reasoning of a dropped packet.

4. A method according to claim 3, wherein the PCC rule name has a PCC rule type that is either dynamic or pre-defined.

5. A method according to claim 1, wherein the fields needed for the public parts includes at least one of
    a rule activation field,
    a Gx/Gxc monitoring field,
    a dependency to online charging, wherein a rating group visible in the captured packet is the same that is visible on an OCS interface, and
    a dependency to offline charging, wherein the rating group visible in the captured packet is the same that is visible in charging data records CDR on Bp and GTP' interfaces.

6. A method according to claim 5, wherein the rule activation field includes at least one of a rating group, a service identification, a monitoring key, and a filter for matching traffic to the rule.

7. A method according to claim 1, further comprising adding one or multiple metadata fields to the same packet.

8. A method according to claim 1, wherein the metadata indicates to a network operator what was the treatment like in the network apparatus for a specific packet and packet flow.

9. A method according to claim 1, wherein the metadata enables a network operator to compare the charging and policy control treatment received by different packet flows in the network apparatus for a specific packet and packet flow.

10. A method according to claim 1, further comprising adding the metadata in a PCAP next generation PCAP-NG dump file format directly to the packet itself.

11. A method according to claim 1, further comprising encoding the metadata by using a suitable encoding method, such as a type-length-value TLV structure.

12. A method according to claim 1, wherein the metadata is added to the packet at the specific capture points located in the ingress and/or egress of packet processing.

13. A method according to claim 12, wherein
    the metadata is collected in memory buffers, and
    the collected metadata is inserted to a packet at the capture point for sending the metadata as part of a packet capture file to a product-specific data aggregation service.

14. A method according to claim 13, wherein the packet capture file is analysable by means of a de-facto standard Wireshark tool family.

15. An apparatus comprising:
    at least one processor; and
    at least one memory including a computer program code,
    wherein the at least one memory and the computer program code are configured to, with the at least one processor, cause the apparatus to perform any of the method steps of claim 1.

16. A computer program product embodied on a non-transitory computer-readable medium, said computer-readable medium comprising program instructions which, when run on a computing apparatus, causes the computing apparatus to perform a method according to claim 1.

17. A method for subscriber tracing in a communications system, said method comprising:
    capturing, in a network apparatus, user plane packets, wherein the apparatus implements a 3GPP policy and charging enforcement functionality PCEF; and
    adding packet-specific metadata to a captured user plane packet,
    wherein the packet-specific metadata is used for facilitating subscriber-specific troubleshooting of core network elements, and
    wherein the metadata enables a network operator to compare the charging and policy control treatment received by different packet flows in the network apparatus for a specific packet and packet flow.

18. A method for subscriber tracing in a communications system, said method comprising:
    capturing, in a network apparatus, user plane packets, wherein the apparatus implements a 3GPP policy and charging enforcement functionality PCEF; and
    adding packet-specific metadata to a captured user plane packet,
    wherein the packet-specific metadata is used for facilitating subscriber-specific troubleshooting of core network elements,
    wherein the metadata is added to the packet at the specific capture points located in the ingress and/or egress of packet processing,
    wherein the metadata is collected in memory buffers, and
    wherein the collected metadata is inserted to a packet at the capture point for sending the metadata as part of a packet capture file to a product-specific data aggregation service.

* * * * *